(12) United States Patent
Won et al.

(10) Patent No.: US 12,549,703 B2
(45) Date of Patent: Feb. 10, 2026

(54) STEREOSCOPIC IMAGE DISPLAY DEVICE

(71) Applicant: SAMSUNG DISPLAY CO., LTD., Yongin-si (KR)

(72) Inventors: Byeong Hee Won, Yongin-si (KR); Hyun Jin Cho, Yongin-si (KR)

(73) Assignee: SAMSUNG DISPLAY CO., LTD.

( * ) Notice: Subject to any disclaimer, the term of this patent is extended or adjusted under 35 U.S.C. 154(b) by 0 days.

(21) Appl. No.: 18/615,086

(22) Filed: Mar. 25, 2024

(65) Prior Publication Data
US 2024/0430397 A1 Dec. 26, 2024

(30) Foreign Application Priority Data
Jun. 26, 2023 (KR) .......................... 10-2023-0082169

(51) Int. Cl.
| | |
|---|---|
| *H04N 13/305* | (2018.01) |
| *G02B 30/27* | (2020.01) |
| *H04N 13/125* | (2018.01) |
| *H04N 13/324* | (2018.01) |

(52) U.S. Cl.
CPC ........... *H04N 13/305* (2018.05); *G02B 30/27* (2020.01); *H04N 13/125* (2018.05)

(58) Field of Classification Search
None
See application file for complete search history.

(56) References Cited

U.S. PATENT DOCUMENTS

| | | | |
|---|---|---|---|
| 10,630,967 | B2 | 4/2020 | Wu |
| 11,672,153 | B2 | 6/2023 | Chae et al. |
| 2009/0309109 | A1* | 12/2009 | Chang ................... H10K 59/35 257/89 |

(Continued)

FOREIGN PATENT DOCUMENTS

| | | |
|---|---|---|
| CN | 105629490 A | 6/2016 |
| KR | 10-2016397 | 8/2019 |
| KR | 10-2021-0087613 A | 7/2021 |

OTHER PUBLICATIONS

"Does the Galaxy Note 2 use Ignis' AdMo-p technology?", OLED-info, https://http://www.oled-info.com/does-galaxy-note-2-use-ignis-admo-p-technology, 2012 (Year: 2012).*

(Continued)

*Primary Examiner* — Hung Q Dang
(74) *Attorney, Agent, or Firm* — F. CHAU & ASSOCIATES, LLC (57) ABSTRACT

A stereoscopic image display device includes pixels arranged in a first direction and a second direction perpendicular to the first direction, and including light emitting surfaces facing a third direction perpendicular to the first and second directions, and a lens overlapping the pixels in the third direction and arranged such that a long side of the lens is slanted with respect to the second direction. The pixels include first pixels having a first arrangement of first to third sub-pixels, and second pixels having a second arrangement of the first to third sub-pixels, wherein the first sub-pixels of each of the first pixels arranged along the long side are aligned with each other, and the third sub-pixels of each of the second pixels arranged along the long side are not aligned with the third sub-pixels of the first pixels arranged along the long side.

18 Claims, 6 Drawing Sheets

(56) References Cited

U.S. PATENT DOCUMENTS

| | | | | |
|---|---|---|---|---|
| 2012/0236405 A1* | 9/2012 | Ohyama | ............... | H04N 13/31 |
| | | | | 359/464 |
| 2014/0192047 A1* | 7/2014 | Mishima | ............... | G02B 30/27 |
| | | | | 345/419 |
| 2021/0373369 A1* | 12/2021 | Tomizawa | ............ | G02F 1/1362 |
| 2022/0260850 A1* | 8/2022 | Grossmann | ............ | G02B 30/30 |

OTHER PUBLICATIONS

"Subpixel Zoo: A Catalog of Subpixel Geometry," geometrian.com, https://geometrian.com/resources/subpixelzoo/, 2025 (Year: 2025).*

* cited by examiner

STEREOSCOPIC IMAGE DISPLAY DEVICE

CROSS-REFERENCE TO RELATED APPLICATION

The application claims priority to and the benefit of Korean Patent Application No. 10-2023-0082169, filed Jun. 26, 2023, which is hereby incorporated by reference for all purposes as if fully set forth herein.

BACKGROUND

Technical Field

The present invention relates to a stereoscopic image display device, and more particularly to a stereoscopic image display device having reduced crosstalk between viewpoints.

Discussion of Related Art

As information technology develops, the significance of a display device as a medium connecting a user and information has increased. Accordingly, the use of display devices, such as a liquid crystal display device or an organic light emitting display device, has increased.

A stereoscopic image display device may generate an image having a three-dimensional (3D) effect by presenting an image or images to a user, which simulate the way the user perceives depth in the real world. For example, the stereoscopic image display device may provide different images to the left and right eyes of the user that take advantage of a binocular parallax between the left and right eyes and so that the user may perceive a 3D effect.

Recently, studies on an autostereoscopic method in which stereoscopic glasses are not worn have been actively conducted. The autostereoscopic method may include a lenticular method for separating left and right eye images using a cylindrical lens array, a barrier method for separating left and right eye images using a barrier, and the like.

An autostereoscopic display device may form a light field composed of a plurality of viewpoints. In this case, crosstalk between the viewpoints may occur in which adjacent viewpoints partially overlap.

SUMMARY

An aspect of the present invention is to provide a stereoscopic image display device capable of reducing crosstalk.

A stereoscopic image display device according to an embodiment of the present invention may include a plurality of pixels arranged in a first direction and a second direction perpendicular to the first direction, and including light emitting surfaces facing a third direction perpendicular to the first direction and the second direction, and a lens overlapping the plurality of pixels in the third direction and arranged such that a long side of the lens is slanted with respect to the second direction, wherein the plurality of pixels including a plurality of first pixels having a first arrangement of first sub-pixels, second sub-pixels, and third sub-pixels, and a plurality of second pixels having a second arrangement of the first sub-pixels, the second sub-pixels, and the third sub-pixels, wherein the first sub-pixels of each of the plurality of first pixels arranged along the long side of the lens are aligned with each other, and wherein the third sub-pixels of each of the plurality of second pixels arranged along the long side of the lens are not aligned with the third sub-pixels of each of the plurality of first pixels arranged along the long side of the lens.

The first sub-pixels of each of the plurality of first pixels and the plurality of second pixels arranged along the long side of the lens may be aligned with each other.

The second sub-pixels of each of the plurality of first pixels and the plurality of second pixels arranged along the long side of the lens may be aligned with each other, and the third sub-pixels of each of the plurality of first pixels arranged along the long side of the lens may be aligned with each other.

An outline shape surrounding the first pixels and an outline shape surrounding the second pixels may be different from each other.

A stereoscopic image display device according to an embodiment of the present invention may include a plurality of pixels arranged in a first direction and a second direction perpendicular to the first direction, and including light emitting surfaces in a third direction perpendicular to the first direction and the second direction, and a plurality of lenses overlapping the plurality of pixels in the third direction and arranged such that long sides of the plurality of lenses have a first angle greater than 0 degrees with respect to the second direction. Each pixel of the plurality of pixels may include a first sub-pixel emitting light of a first color, a second sub-pixel emitting light of a second color, and a third sub-pixel emitting light of a third color. The plurality of pixels may include a first pixel and a second pixel, the first sub-pixel of the first pixel and the first sub-pixel of the second pixel may be aligned with each other in a first line parallel to the long sides, the second sub-pixel of the first pixel and the second sub-pixel of the second pixel may be aligned with each other in a second line parallel to the long sides, and a direction in which the third sub-pixel of the first pixel and the third sub-pixel of the second pixel are aligned with each other in a third line may not be parallel to the long sides.

An outline shape surrounding the first, second, and third sub-pixels of the first pixel and an outline shape surrounding the first, second, and third sub-pixels of the second pixel may be different from each other.

The outline shape surrounding the first, second, and third sub-pixels of the first pixel and an outline shape surrounding the first, second, and third sub-pixels of a pixel located in the second direction from the first pixel may be the same.

The outline shape surrounding the first, second, and third sub-pixels of the second pixel and an outline shape surrounding the first, second, and third sub-pixels of a pixel located in the second direction from the second pixel may be the same.

At least some of first sub-pixels of pixels arranged in the first direction among the pixels may have different coordinates in the second direction, at least some of second sub-pixels of the pixels arranged in the first direction among the pixels may have different coordinates in the second direction, and the third sub-pixels of the pixels arranged in the first direction among the pixels may have the same coordinates in the second direction.

A length of the third sub-pixel in the second direction may be greater than a length of the first sub-pixel in the second direction and a length of the second sub-pixel in the second direction, and the third sub-pixel may be located in the first direction from the first sub-pixel and the second sub-pixel.

The length of the third sub-pixel in the second direction may be greater than a sum of the length of the first sub-pixel in the second direction and the length of the second sub-pixel in the second direction.

A distance between the first sub-pixel and the second sub-pixel of the first pixel may be equal to a distance between the first sub-pixel and the second sub-pixel of the second pixel.

A stereoscopic image display device according to an embodiment of the present invention may include a plurality of pixels arranged in a first direction and a second direction perpendicular to the first direction, and including light emitting surfaces facing a third direction perpendicular to the first direction and the second direction, and a plurality of lenses overlapping the plurality of pixels in the third direction and arranged such that long sides of the plurality of lenses have a first angle greater than 0 degrees with respect to the second direction. Each pixel of the plurality of pixels may include a first sub-pixel emitting light of a first color, a second sub-pixel emitting light of a second color, and a third sub-pixel emitting light of a third color. The plurality of pixels may include a first pixel and a second pixel, the second sub-pixel of the first pixel may be located in the second direction from the first sub-pixel of the first pixel, and the first sub-pixel of the second pixel may be located in the second direction from the second sub-pixel of the second pixel.

An outline shape surrounding the first, second, and third sub-pixels of the first pixel and an outline shape surrounding the first, second, and third sub-pixels of the second pixel may be the same.

The second sub-pixel of a pixel located in the second direction from the first pixel may be located in the second direction from the first sub-pixel of the pixel located in the second direction from the first pixel.

The first sub-pixel of a pixel located in the second direction from the second pixel may be located in the second direction from the second sub-pixel of the pixel located in the second direction from the second pixel.

At least some of the first sub-pixels of the plurality of pixels arranged in the first direction may have different coordinates in the second direction, at least some of the second sub-pixels of the plurality of pixels arranged in the first direction may have different coordinates in the second direction, and the third sub-pixels of the plurality of pixels arranged in the first direction may have the same coordinates in the second direction.

A length of the third sub-pixel in the second direction may be greater than a length of the first sub-pixel in the second direction and a length of the second sub-pixel in the second direction, and the third sub-pixel may be located in the first direction from the first sub-pixel and the second sub-pixel.

The length of the third sub-pixel in the second direction may be greater than a sum of the length of the first sub-pixel in the second direction and the length of the second sub-pixel in the second direction.

A distance between the first sub-pixel and the second sub-pixel of the first pixel may be equal to a distance between the second sub-pixel and the first sub-pixel of the second pixel.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION

Hereinafter, embodiments of the present invention will be described in detail with reference to the accompanying drawings so that those of ordinary skill in the art may easily implement the present invention. The present invention may be embodied in various different forms and is not limited to embodiments described herein.

In order to clearly describe the present invention, parts that are not related to the description may be omitted, and the same or similar components are denoted by the same reference numerals throughout the specification. Therefore, the reference numerals described above may also be used in other drawings.

In addition, the size and thickness of each component shown in the drawings may be arbitrarily shown for convenience of description, and thus the present invention is not necessarily limited to those shown in the drawings. In the drawings, thicknesses may be exaggerated to clearly express the layers and regions.

In addition, in the description, the expression "is the same" may mean "substantially the same". That is, it may be the same enough to convince those of ordinary skill in the art to be the same. In other expressions, "substantially" may be omitted.

Figure 1:
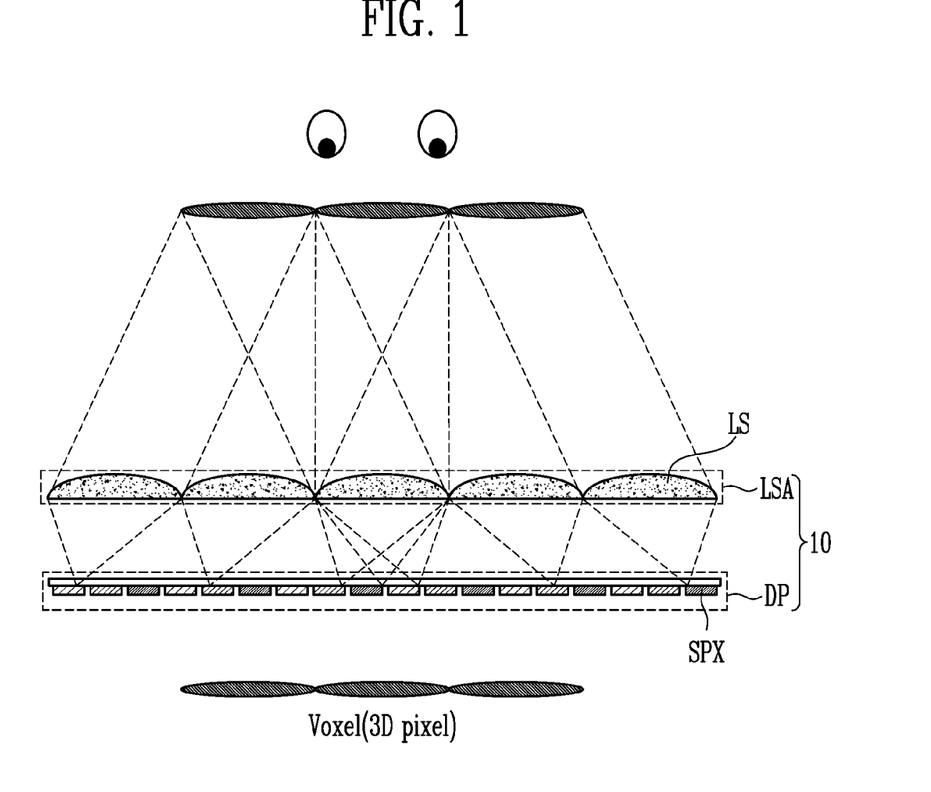
FIG. 1 is a diagram for explaining a lens array type stereoscopic image display device.

FIG. 1 is a diagram for explaining a lens array type stereoscopic image display device.

Referring to FIG. 1, a display device 10 may include a display panel DP and a lens array LSA.

The display panel DP may include sub-pixels SPX that may emit light to display an image. Different sub-pixels SPX may output different color light. In an embodiment, each of the sub-pixels SPX may output light of a first color (for example, red), light of a second color (for example, green), or light of a third color (for example, blue). However, this is only an example, and the color of light emitted from the sub-pixels SPX is not limited thereto. Further, the number of colors is not limited thereto. Light of various colors for realizing a color gamut may be output. The display panel DP may include an organic light emitting display panel, a liquid crystal display panel, a quantum dot display panel, or the like.

The lens array LSA may be disposed on the display panel DP. The lens array LSA may include lenses LS that refract light incident from the sub-pixels SPX. For example, the lens array LSA may be implemented as a lenticular lens array, a micro lens array, or the like.

A light field display may be a 3D display device that implements a stereoscopic image. The light field display may implement the stereoscopic image by forming a light field expressed as a vector distribution (intensity, direction) of light in space using a flat panel display and an optical element (for example, the lens array LSA). The light field display may implement a natural stereoscopic image because a viewer can perceive depth and a side of an object in the stereoscopic image. The light field display may be a display technology used in various ways through convergence with AR (Augmented Reality) technology, etc.

The light field may be implemented in a number of methods. For example, the light field may be formed by a method to create multi-directional light fields using multiple projectors, a method of controlling the direction of light using a diffraction grating, a method of adjusting the direction and intensity (luminance) of light according to the combination of each pixel using two or more panels, a method for controlling the direction of light using a pinhole or barrier, a method for controlling the direction in which light is refracted through a lens array, or the like.

In an embodiment, as shown in FIG. 1, the lens array type stereoscopic image display device 10 may display a stereoscopic image (3D image) by forming the light field.

A plurality of sub-pixels SPX may be arranged to correspond to each lens LS. Light emitted from a sub-pixel SPX may be refracted by the corresponding lens LS and proceed in a specific direction. Light emitted from each of the sub-pixels SPX may be refracted by the lenes LS in different directions to form a light field represented by light intensity and direction. When a viewer looks at the display device 10 within the light field formed as described above, the viewer can perceive a three-dimensional effect of a corresponding image.

Image information according to the viewpoint of the viewer within the light field may be defined and processed in units of voxels. A voxel may be understood as graphic information defining a predetermined point (or pixel) in a 3D space.

A resolution of a 2D image may be determined by the number of pixels (for example, density) in the same area. For example, when the number of pixels (or sub-pixels SPX) increases in the same area, the resolution of the 2D image may increase. That is, the display panel DP having a high pixel density may display a high-resolution image. Similarly, when the number of voxels at the same viewpoint through the lens array LSA increases, the resolution of a stereoscopic image may increase.

Figure 2:
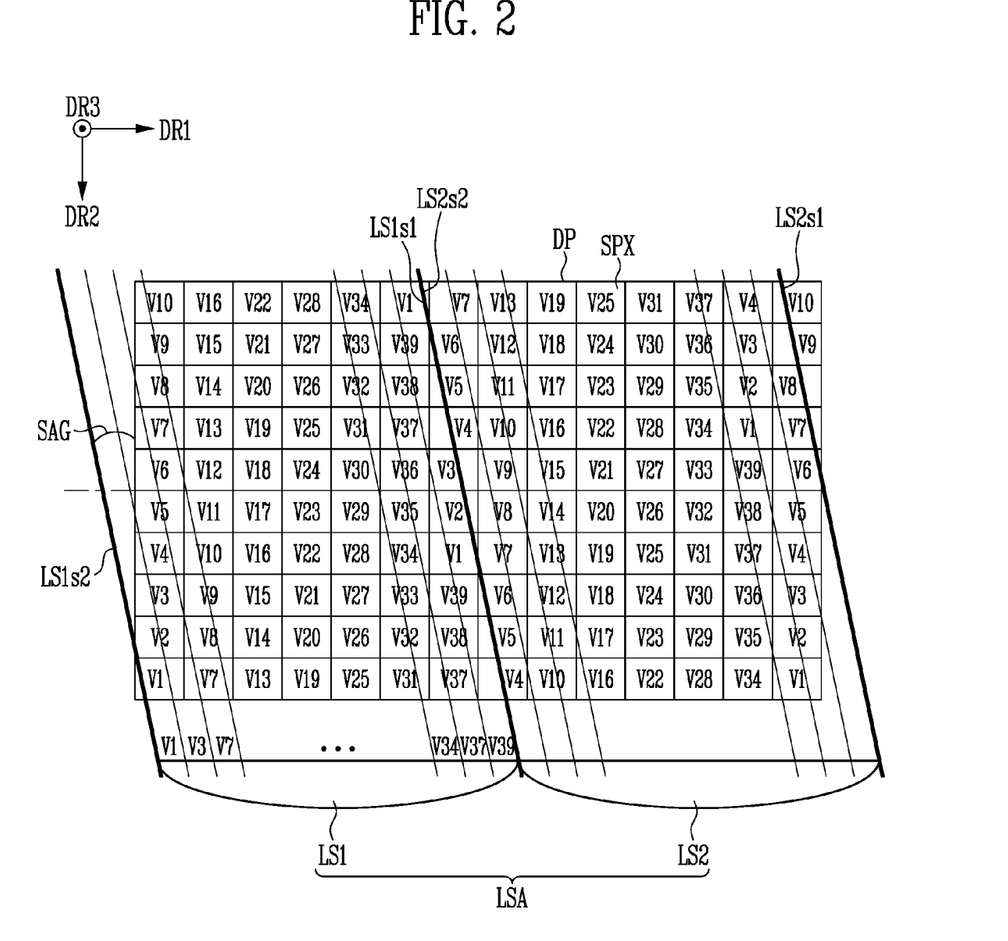
FIG. 2 is a diagram for explaining a relationship between a lens array and a display panel according to an embodiment of the present invention.

FIG. 2 is a diagram for explaining a relationship between a lens array and a display panel.

The display panel DP may include the sub-pixels SPX arranged in a first direction DR1 and a second direction DR2 perpendicular to the first direction DR1. The sub-pixels SPX may include light emitting surfaces in a third direction DR3 perpendicular to the first direction DR1 and the second direction DR2. The third direction DR3 may be perpendicular to a plane formed by the first direction DR1 and the second direction DR2.

The lens array LSA may include a plurality of lenses LS1, LS2, . . . . The lenses LS1, LS2, . . . may overlap the sub-pixels SPX in the third direction DR3. The lenses LS1, LS2, . . . may have long sides crossing the sub-pixels SPX. The lenses LS1, LS2, . . . may be arranged such that their long sides have an angle SAG greater than 0 degree with respect to the second direction DR2. For example, the lenses LS1, LS2, . . . may be slanted lenticular lenses. For example, a first lens LS1 may include a first long side LS1s1 and a second long side LS1s2 that are parallel to each other. Also, the second lens LS2 may include a first long side LS2s1 and a second long side LS2s2 that are parallel to each other. The lenses LS1, LS2, . . . may be arranged in the first direction DR1. However, in an embodiment, the angle SAG may be 0 degrees. When the angle SAG is 0 degrees, long sides LS1s1, LS1s2, LS2s1, LS2s2, . . . of the lenses LS1, LS2, . . . may extend in the second direction DR2.

A lower surface (a surface facing the sub-pixels) of each of the lenses LS1, LS2, . . . may be partitioned into a plurality of viewpoint areas V1 to V39. The plurality of viewpoint areas V1 to V39 may not be physically partitioned, but may be virtual areas, and may be defined in various ways according to the resolution of the display panel DP, the specifications of the lenses LS1, LS2, . . . , the number of viewpoints to be provided to a viewer, or the like. Each of the lenses LS1, LS2, . . . may distribute light corresponding to each of the viewpoint areas V1 to V39 in different directions (different viewpoints), so that the viewer may visually recognize a multi-view image in which an images varies depending on the location.

The sub-pixels SPX may overlap one or more of the plurality of viewpoint areas V1 to V39. For example, the sub-pixels SPX may be positioned to correspond to the plurality of viewpoint areas V1 to V39. Sub-pixels SPX corresponding to a same viewpoint area may display an image for the same viewpoint. For example, since there are 39 viewpoint areas V1 to V39 in FIG. 2, the display panel DP may simultaneously display 39 images.

The display device 10 may display a stereoscopic image by displaying a left-eye image using sub-pixels SPX overlapping viewpoint areas V1 to V20 and displaying a right-eye image using sub-pixels SPX overlapping viewpoint areas V21 to V39. In this case, the viewer may be positioned so that the left-eye image is visually recognized by the left eye and the right-eye image is visually recognized by the right eye.

The sub-pixels SPX may be arranged in various structures such as RGB stripe, diamond PENTILE™, S-stripe, Real RGB, normal PENTILET, or the like.

Figure 3:
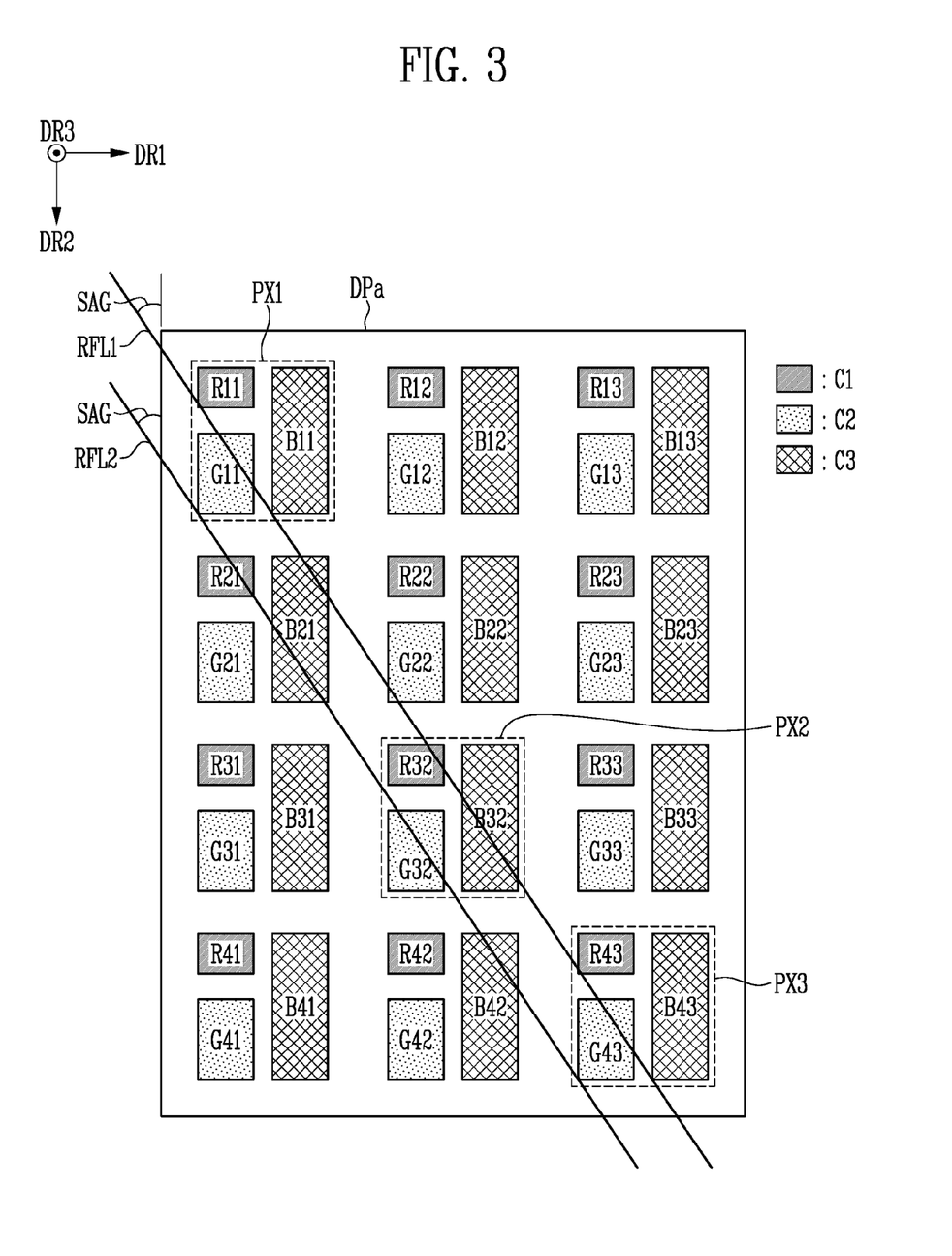
FIG. 3 is a diagram for explaining a display panel according to an embodiment of the present invention.

FIG. 3 is a diagram for explaining a display panel according to an embodiment of the present invention.

Referring to FIG. 3, a display panel DPa according to an embodiment of the present invention may include a plurality of pixels PX1, PX2, PX3, . . . . Each of the plurality of pixels PX1, PX2, PX3, . . . may include a first sub-pixel, a second sub-pixel, and a third sub-pixel. Positions and shapes of the pixels PX1, PX2, PX3, . . . , first sub-pixels R11 to R43, second sub-pixels G11 to G43, and third the sub-pixels B11 to B43, are described based on a light emitting surface of a light emitting element. That is, pixel circuits may be arranged independent of the pixels or sub-pixels.

The pixels PX1, PX2, PX3, . . . may be arranged in the first direction DR1 and the second direction DR2 perpendicular to the first direction DR1. The pixels PX1, PX2, PX3, . . . may include light emitting surfaces in the third direction DR3 perpendicular to the first direction DR1 and the second direction DR2.

Lenses may overlap the pixels PX1, PX2, PX3, . . . . The lenses may overlap the pixels PX1, PX2, PX3, . . . generally in the third direction DR3. The lenses may overlap the pixels PX1, PX2, PX3, . . . may be arranged such that their long sides have a first angle SAG with respect to the second direction DR2. The shape of the lenses may refer to FIG. 2.

Each of the pixels PX1, PX2, PX3, . . . may include a first sub-pixel emitting light of a first color, a second sub-pixel emitting light of a second color, and a third sub-pixel emitting light of a third color. The first color may be one of red, green, or blue. The second color may be one of red, green, or blue, other than the first color. The third color may be one of red, green, or blue, other than the first color and the second color. In an embodiment additional and/or other colors may be emitted. For example, magenta, cyan, and yellow may be used as the first to third colors instead of red, green, and blue.

The sub-pixels R11 to R43, G11 to G43, B11 to B43, . . . may be arranged in an S-stripe structure. For example, referring to a first pixel PX1, a length of a third sub-pixel B11 in the second direction DR2 may be greater than a length of a first sub-pixel R11 in the second direction DR2 and a length of a second sub-pixel G11 in the second direction DR2. The third sub-pixel B11 may be located in the first direction DR1 from the first sub-pixel R11 and the second sub-pixel G11. According to an embodiment, the length of the third sub-pixel B11 in the second direction DR2 may be greater than a sum of the length of the first sub-pixel R11 in the second direction DR2 and the length of the second sub-pixel G11 in the second direction DR2.

Referring to the first direction DR1 as a row direction and the second direction DR2 as a column direction, the pixels PX1, PX2, PX3, . . . may be arranged in a matrix form. The first sub-pixels R11 to R43, . . . may be arranged in a matrix form. The second sub-pixels G11 to G43, . . . may be arranged in a matrix form. The third sub-pixels B11 to B43, . . . may be arranged in a matrix form.

A first reference line RFL1 may be an imaginary reference line parallel to the long sides of the lenses. Accordingly, the first reference line RFL1 may have the first angle SAG with respect to the second direction DR2. The first reference line RFL1 may be positioned to pass through a vertex (for example, a lower left vertex) of the first sub-pixel R11 of the first pixel PX1. The first sub-pixel R11 may be a sub-pixel at a location where crosstalk with other viewpoints is reduced or minimized (or does not occur).

In this case, vertices of the first sub-pixels constituting a same viewpoint as the first sub-pixel R11 may be located on the first reference line RFL1. For example, since the vertex of the first sub-pixel R43 overlaps the first reference line RFL1, the first sub-pixel R11 of the first pixel PX1 and the first sub-pixel R43 of the third pixel PX3 may implement an image of a same viewpoint with reduced or minimal crosstalk.

The vertex of the first sub-pixel R32 of the second pixel PX2 may not overlap the first reference line RFL1. The first reference line RFL1 may be positioned to cross a light emitting surface of the first sub-pixel R32. Therefore, if the first sub-pixel R32 displays an image of the same viewpoint as first sub-pixels R11 and R43, crosstalk with other viewpoints may be increased. For example, if the first sub-pixel R32 displays an image of the same viewpoint as first sub-pixels R11 and R43, crosstalk with other viewpoints may occur to a significant extent.

A second reference line RFL2 may be an imaginary reference line parallel to the long sides of the lenses. Accordingly, the second reference line RFL2 may have the first angle SAG with respect to the second direction DR2. The second reference line RFL2 may be positioned to pass through a vertex (for example, a lower left vertex) of the second sub-pixel G11 of the first pixel PX1. The second sub-pixel G11 may be a sub-pixel at a location where crosstalk with other viewpoints is reduced or minimized (or does not occur).

In this case, vertices of the second sub-pixels constituting a same viewpoint as the second sub-pixel G11 may be located on the second reference line RFL2. For example, since the vertex of the second sub-pixel G43 overlaps the second reference line RFL2, the second sub-pixel G11 of the first pixel PX1 and the second sub-pixel G43 of the third pixel PX3 may implement an image of the same viewpoint with reduced or minimal crosstalk.

The vertex of the second sub-pixel G32 of the second pixel PX2 may not overlap the second reference line RFL2.

The second reference line RFL2 may be positioned to cross a light emitting surface of the second sub-pixel G32. Therefore, if the second sub-pixel G32 displays an image of the same viewpoint as the second sub-pixels G11 and G43, crosstalk with other viewpoints may be increased. For example, if the second sub-pixel G32 displays an image of the same viewpoint as the second sub-pixels G11 and G43, crosstalk with other viewpoints may occur to a significant extent.

Figure 4:
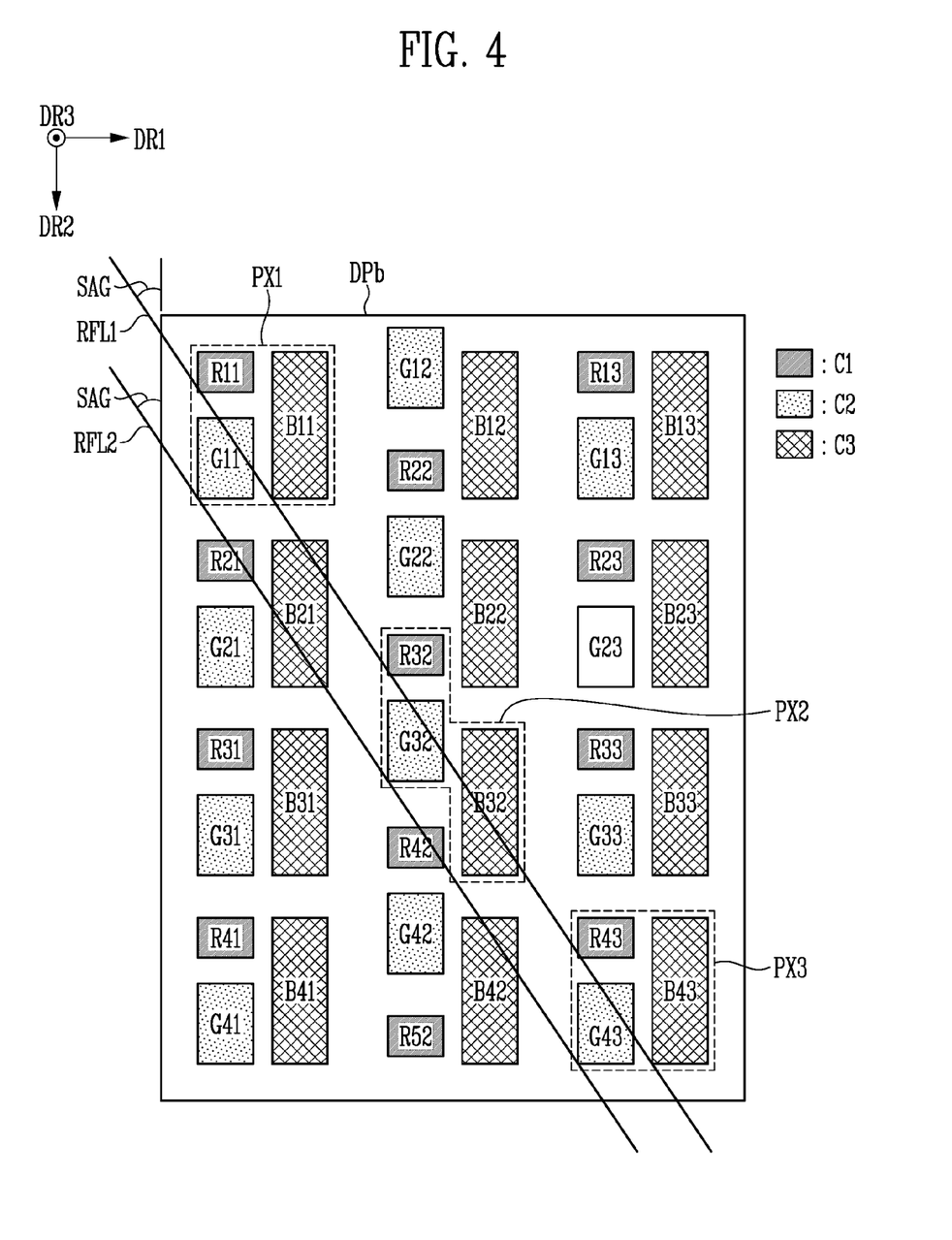
FIG. 4 and FIG. 5 are diagrams for explaining a display panel according to an embodiment of the present invention.
Figure 5:
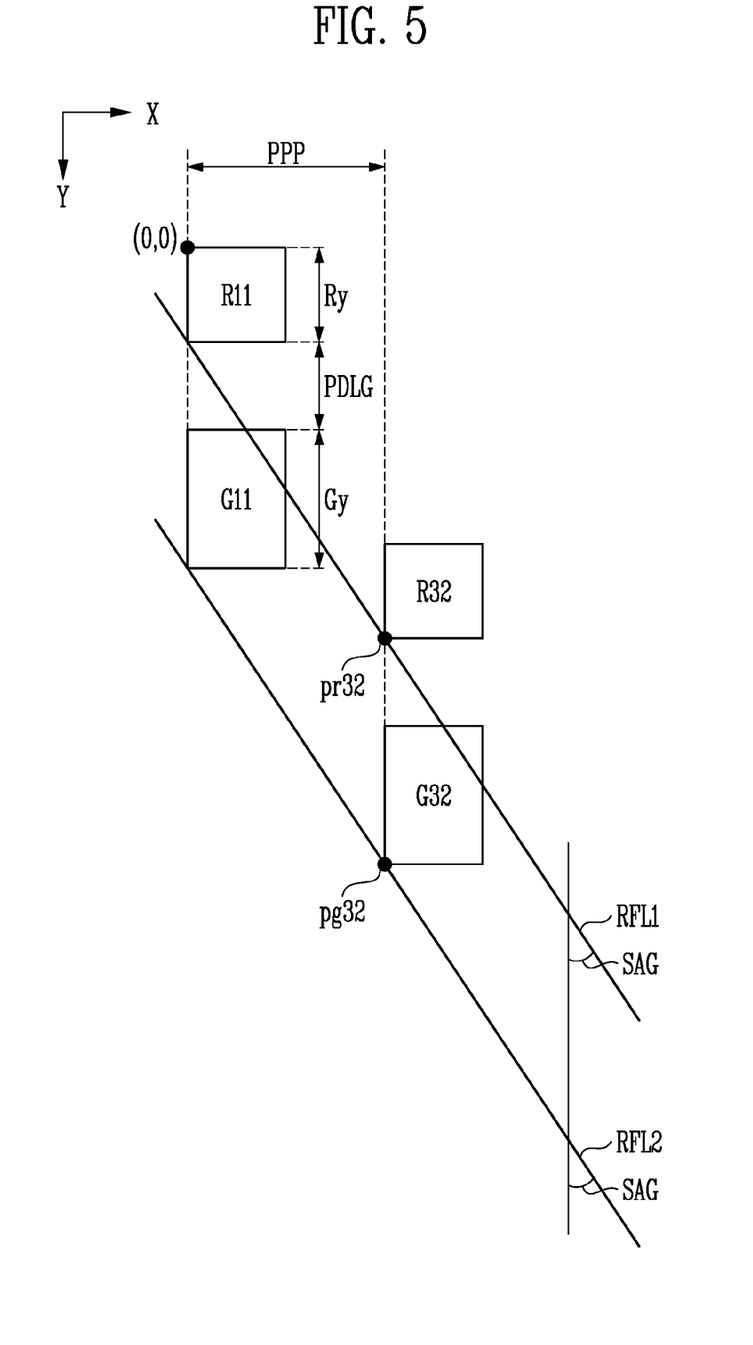

FIG. 4 and FIG. 5 are diagrams for explaining a display panel according to an embodiment of the present invention.

Referring to FIG. 4, a display panel DPb may include a plurality of pixels PX1, PX2, PX3, . . . . Each of the plurality of pixels PX1, PX2, PX3, . . . includes an arrangement of sub-pixels. In the display panel DPb, the arrangement of the sub-pixels within different pixels may differ. For example, a position of the first sub-pixels R11 to R43, . . . and the second sub-pixels G11 to G43, . . . may differ relative to the third sub-pixels B11 to B43.

In the display panel DPb, the first sub-pixel R11 of the first pixel PX1 and the first sub-pixel R32 of the second pixel PX2 may be aligned along an imaginary first reference line RFL1 parallel to the long sides of the lenses. For example, the first sub-pixel R11 of the first pixel PX1 and the first sub-pixel R32 of the second pixel PX2 may be aligned with each other in a first line parallel to the long sides of the lenses. Also, the first sub-pixel R43 of the third pixel PX3 may be aligned along the first reference line RFL1. The alignment of the first sub-pixels R11, R32, and R43 along the first reference line RFL1 may mean that the same point (for example, a lower left vertex) of the first sub-pixels R11, R32, and R43 overlaps the first reference line RFL1.

In addition, the second sub-pixel G11 of the first pixel PX1 and the second sub-pixel G32 of the second pixel PX2 may be aligned along an imaginary second reference line RFL2 parallel to the long sides of the lenses. For example, the second sub-pixel G11 of the first pixel PX1 and the second sub-pixel G32 of the second pixel PX2 may be aligned with each other in a second line parallel to the long sides of the lenses. Also, the second sub-pixel G43 of the third pixel PX3 may be aligned along the imaginary second reference line RFL2.

The third sub-pixels B11 to B43, . . . may be arranged in a matrix form as shown in FIG. 3 and FIG. 4. In this case, a direction in which the third sub-pixel B11 of the first pixel PX1 and the third sub-pixel B32 of the second pixel PX2 are aligned may not be parallel to the long sides. For example, a direction in which the third sub-pixel B11 of the first pixel PX1 and the third sub-pixel B32 of the second pixel PX2 may be aligned with each other in a third line is not parallel to the long sides. Also, a direction in which the third sub-pixel B11 of the first pixel PX1 and the third sub-pixel B43 of the third pixel PX3 are aligned may be parallel to the long sides. Also, a direction in which the third sub-pixel B11 of the first pixel PX1 and the third sub-pixel B32 of the second pixel PX2 are aligned may not be parallel to the long sides. Also, a direction in which the third sub-pixel B32 of the second pixel PX2 and the third sub-pixel B43 of the third pixel PX3 are aligned may not be parallel to the long sides.

According to the present embodiment, the first sub-pixels R11, R32, and R43 constituting a same viewpoint may display an image with reduced or minimal crosstalk. Meanwhile, second sub-pixels G11, G32, and G43 constituting a same viewpoint may display an image with reduced or minimal crosstalk.

According to an embodiment, an outline shape surrounding the first, second, and third sub-pixels R11, G11, and B11 of the first pixel PX1 and an outline shape surrounding the first, second, and third sub-pixels R32, G32, and B32 of the second pixel PX2 may be different from each other. For example, when an outline shape of the first pixel PX1 is a rectangle, an outline shape of the second pixel PX2 may not be a rectangle. For example, the first sub-pixel R32 of the second pixel PX2 may protrude in a direction opposite to the second direction DR2 relative to the third sub-pixel B32 (for example, a protruding shape).

An outline shape surrounding the first, second, and third sub-pixels R11, G11, and B11 of the first pixel PX1 and an outline shape surrounding the first, second, and third sub-pixels R21, G21, and B21 of a pixel located in the second direction DR2 from the first pixel PX1 may be the same (for example, a rectangular shape).

The outline shape surrounding the first, second, and third sub-pixels R32, G32, and B32 of the second pixel PX2 and an outline shape surrounding the first, second, and third sub-pixels R42, G42, and B42 of a pixel located in the second direction DR2 from the second pixel PX2 may be the same (for example, a protruding shape).

According to an embodiment, at least some of first sub-pixels R31, R32, and R33 of pixels . . . , PX2, . . . arranged in the first direction DR1 among the pixels PX1, PX2, PX3, . . . may have different coordinates in the second direction DR2. For example, although coordinates of the first sub-pixels R31 and R33 in the second direction DR2 are the same, the first sub-pixel R32 may be located in a direction opposite to the second direction DR2 relative to the first sub-pixels R31 and R33.

At least some of second sub-pixels G31, G32, and G33 of the pixels . . . , PX2, . . . arranged in the first direction DR1 among the pixels PX1, PX2, PX3, . . . may have different coordinates in the second direction DR2. For example, although coordinates of the second sub-pixels G31 and G33 in the second direction DR2 are the same, the second sub-pixel G32 may be located in a direction opposite to the second direction DR2 relative to the second sub-pixels G31 and G33.

Third sub-pixels B31, B32, and B33 of the pixels . . . , PX2, . . . arranged in the first direction DR1 among the pixels PX1, PX2, PX3, . . . may have the same coordinates as each other in the second direction DR2. More generally, third sub-pixels of the pixels arranged in the first direction DR1 among the pixels PX1, PX2, PX3, . . . may have the same coordinates as each other in the second direction DR2.

Referring to FIG. 5, an alignment of the first sub-pixels R11 and R32 and the second sub-pixels G11 and G32 will be mathematically described. The first direction DR1 may be defined as an X-axis direction, and the second direction DR2 may be defined as a Y-axis direction. The coordinates of an upper left vertex of the first sub-pixel R11 may be defined as (0, 0). In this case, a Y-axis coordinate of a lower left vertex pr32 of the first sub-pixel R32 may be defined by Equation 1 below. Since an X-axis coordinate of a lower left vertex pr32 of the first sub-pixel R32 is the same as that of the conventional S-stripe structure, a further description thereof will be omitted.

$$R32y = Ry + PPP/\tan(SAG) \quad \text{[Equation 1]}$$

Referring to Equation 1, $R32y$ may be the Y-axis coordinate of the lower left vertex pr32 of the first sub-pixel R32, Ry may be a length of the first sub-pixel R11 in the Y-axis direction, PPP may be a pitch of one pixel (for example, an X-axis distance from a left edge of the first pixel PX1 to a left edge of the second pixel PX2), and tan (SAG) may be a tangent value of the first angle SAG. Here, the first angle is an angle formed between the first reference line RFL1 and the Y-axis direction.

In addition, a Y-axis coordinate of a lower left vertex pg32 of the second sub-pixel G32 may be defined by Equation 2 below. Since an X-axis coordinate of the lower left vertex pg32 of the second sub-pixel G32 is the same as that of the conventional S-stripe structure, a description thereof will be omitted.

$$G32y = Ry + Gy + PDLG + PPP/\tan(SAG) \quad \text{[Equation 2]}$$

Referring to Equation 2, $G32y$ may be the Y-axis coordinate of the lower left vertex pg32 of the second sub-pixel G32, Ry may be a length of the first sub-pixel R11 in the Y-axis direction, Gy may be a length of the second sub-pixel G11 in the Y-axis direction, PDLG may be a distance between the first sub-pixel R11 and the second sub-pixel G11, PPP may be a pitch of one pixel (for example, an X-axis distance from a left edge of the first pixel PX1 to a left edge of the second pixel PX2), and tan (SAG) may be a tangent value of the first angle SAG.

In an embodiment, a distance between the first sub-pixel R11 and the second sub-pixel G11 of the first pixel PX1 may be the same as a distance between the first sub-pixel R32 and the second sub-pixel G32 of the second pixel PX2. In this case, since a distance PDLG between the first sub-pixels and the second sub-pixels may be maintained, the distance between the first sub-pixel R32 and the second sub-pixel G32 may be greater than or equal to a process limit (e.g., a manufacturing process limit).

Figure 6:
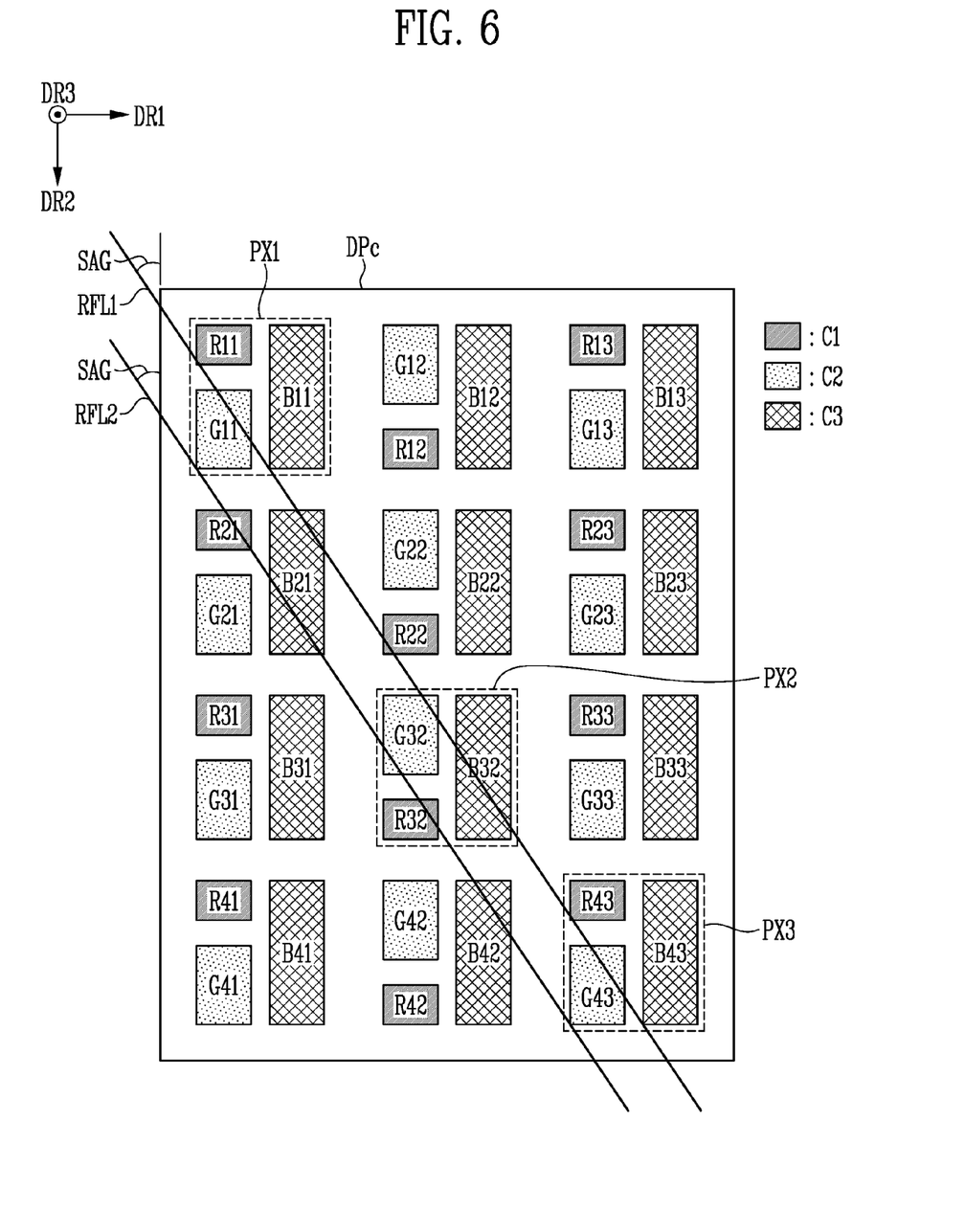
FIG. 6 is a diagram for explaining a display panel according to an embodiment of the present invention.

FIG. 6 is a diagram for explaining a display panel according to an embodiment of the present invention.

Referring to FIG. 6, a display panel DPc may include a plurality of pixels PX1, PX2, PX3, . . . . Each of the plurality of pixels PX1, PX2, PX3, . . . includes an arrangement of sub-pixels. In the display panel DPc, the arrangement of the sub-pixels within different pixels may differ. For example, a position of the first sub-pixels R11 to R43, . . . and the second sub-pixels G11 to G43, . . . may differ relative to the third sub-pixels B11 to B43.

In the display panel DPc, the second sub-pixel G11 of the first pixel PX1 may be located in the second direction DR2 from the first sub-pixel R11. In this case, the first sub-pixel R32 of the second pixel PX2 may be located in the second direction DR2 from the second sub-pixel G32. That is, arrangements of the first sub-pixel and the second sub-pixel of the first pixel PX1 and the second pixel PX2 may be opposite to each other. Meanwhile, the second sub-pixel G43 of the third pixel PX3 may be located in the second direction DR2 from the first sub-pixel R43.

According to an embodiment, crosstalk of first sub-pixels R11, R22, and R43 emitting light of the same viewpoint may be reduced. Meanwhile, crosstalk of second sub-pixels G11, G32, and G43 emitting light of the same viewpoint may be reduced.

In an embodiment, a distance between the first sub-pixel R11 and the second sub-pixel G11 of the first pixel PX1 may be the same as a distance between the first sub-pixel R32 and the second sub-pixel G32 of the second pixel PX2. In this case, since a distance between the first sub-pixels and the second sub-pixels may be maintained, the distance between the first sub-pixel R32 and the second sub-pixel G32 may be greater than or equal to the process limit.

According to an embodiment, an outline shape surrounding the first, second, and third sub-pixels R11, G11, and B11 of the first pixel PX1 and an outline shape surrounding the first, second, and third sub-pixels R32, G32, and B32 of the second pixel PX2 may be the same (for example, a rectangular shape).

The second sub-pixel G21 of a pixel located in the second direction DR2 from the first pixel PX1 may be located in the second direction DR2 from the first sub-pixel R21.

The first sub-pixel R42 of a pixel located in the second direction DR2 from the second pixel PX2 may be located in the second direction DR2 from the second sub-pixel G42.

According to an embodiment, at least some of first sub-pixels R31, R32, and R33 of pixels . . . , PX2, . . . arranged in the first direction DR1 among the pixels PX1, PX2, PX3, . . . may have different coordinates in the second direction DR2. For example, although coordinates of the first sub-pixels R31 and R33 in the second direction DR2 are the same, the first sub-pixel R32 may be located in the second direction DR2 relative to the first sub-pixels R31 and R33.

At least some of second sub-pixels G31, G32, and G33 of the pixels. . . , PX2, . . . arranged in the first direction DR1 among the pixels PX1, PX2, PX3, . . . may have different coordinates in the second direction DR2. For example, although coordinates of the second sub-pixels G31 and G33 in the second direction DR2 are the same, the second sub-pixel G32 may be located in a direction opposite to the second direction DR2 relative to the second sub-pixels G31 and G33.

The third sub-pixels B31, B32, and B33 of the pixels . . . , PX2, . . . arranged in the first direction DR1 among the pixels PX1, PX2, PX3, . . . may have the same coordinates as each other in the second direction DR2. More generally, third sub-pixels of the pixels arranged in the first direction DR1 among the pixels PX1, PX2, PX3, . . . may have the same coordinates as each other in the second direction DR2.

According to an embodiment, a stereoscopic image display device according to the present invention may reduce crosstalk.

The drawings referred to heretofore and the detailed description of the invention described above are merely illustrative of the invention. It is to be understood that the invention has been disclosed for illustrative purposes only and is not intended to limit the meaning or scope of the invention as set forth in the claims. Therefore, those skilled in the art will appreciate that various modifications and equivalent embodiments are possible without departing from the scope of the invention. Accordingly, the true technical protection scope of the invention should be determined by the technical idea of the appended claims.

What is claimed is:

1. A stereoscopic image display device comprising:
a plurality of pixels arranged in a first direction and a second direction perpendicular to the first direction, and including light emitting surfaces facing a third direction perpendicular to the first direction and the second direction; and
a lens overlapping the plurality of pixels in the third direction and arranged such that a long side of the lens is slanted with respect to the second direction,
wherein the plurality of pixels including a plurality of first pixels having a first arrangement of first sub-pixels, second sub-pixels, and third sub-pixels, and a plurality of second pixels having a second arrangement of the first sub-pixels, the second sub-pixels, and the third sub-pixels,
wherein the first sub-pixels of each of the plurality of first pixels arranged along the long side of the lens are aligned with each other, and
wherein the first sub-pixels of each of the plurality of first pixels and the plurality of second pixels arranged along the long side of the lens are aligned with each other, and
wherein the third sub-pixels of each of the plurality of second pixels arranged along the long side of the lens are not aligned with the third sub-pixels of each of the plurality of first pixels arranged along the long side of the lens.

2. The stereoscopic image display device of claim 1, wherein the second sub-pixels of each of the plurality of first pixels and the plurality of second pixels arranged along the long side of the lens are aligned with each other, and
wherein the third sub-pixels of each of the plurality of first pixels arranged along the long side of the lens are aligned with each other.

3. The stereoscopic image display device of claim 1, wherein an outline shape surrounding the first pixels and an outline shape surrounding the second pixels are different from each other.

4. A stereoscopic image display device comprising:
a plurality of pixels arranged in a first direction and a second direction perpendicular to the first direction, and including light emitting surfaces facing a third direction perpendicular to the first direction and the second direction; and
a plurality of lenses overlapping the plurality of pixels in the third direction and arranged such that long sides of the plurality of lenses have a first angle greater than 0 degrees with respect to the second direction,
wherein each pixel of the plurality of pixels includes a first sub-pixel emitting light of a first color, a second sub-pixel emitting light of a second color, and a third sub-pixel emitting light of a third color,
wherein the plurality of pixels includes a first pixel and a second pixel,
wherein the first sub-pixel of the first pixel and the first sub-pixel of the second pixel are aligned with each other in a first line parallel to the long sides,
wherein the second sub-pixel of the first pixel and the second sub-pixel of the second pixel are aligned with each other in a second line parallel to the long sides, and
wherein a direction in which the third sub-pixel of the first pixel and the third sub-pixel of the second pixel are aligned with each other in a third line is not parallel to the long sides.

5. The stereoscopic image display device of claim 4, wherein an outline shape surrounding the first, second, and third sub-pixels of the first pixel and an outline shape surrounding the first, second, and third sub-pixels of the second pixel are different from each other.

6. The stereoscopic image display device of claim 5, wherein the outline shape surrounding the first, second, and third sub-pixels of the first pixel and an outline shape surrounding the first, second, and third sub-pixels of a pixel located in the second direction from the first pixel are the same.

7. The stereoscopic image display device of claim 6, wherein the outline shape surrounding the first, second, and third sub-pixels of the second pixel and an outline shape surrounding the first, second, and third sub-pixels of a pixel located in the second direction from the second pixel are the same.

8. The stereoscopic image display device of claim 4, wherein at least some of first sub-pixels of pixels arranged in the first direction among the pixels have different coordinates in the second direction,
wherein at least some of second sub-pixels of the pixels arranged in the first direction among the pixels have different coordinates in the second direction, and
wherein the third sub-pixels of the pixels arranged in the first direction among the pixels have the same coordinates in the second direction.

9. The stereoscopic image display device of claim 4, wherein a length of the third sub-pixel in the second direction is greater than a length of the first sub-pixel in the second direction and a length of the second sub-pixel in the second direction, and
wherein the third sub-pixel is located in the first direction from the first sub-pixel and the second sub-pixel.

10. The stereoscopic image display device of claim 9, wherein the length of the third sub-pixel in the second direction is greater than a sum of the length of the first sub-pixel in the second direction and the length of the second sub-pixel in the second direction.

11. The stereoscopic image display device of claim 4, wherein a distance between the first sub-pixel and the second sub-pixel of the first pixel is equal to a distance between the first sub-pixel and the second sub-pixel of the second pixel.

12. A stereoscopic image display device comprising:
a plurality of pixels arranged in a first direction and a second direction perpendicular to the first direction, and including light emitting surfaces facing a third direction perpendicular to the first direction and the second direction; and
a plurality of lenses overlapping the plurality of pixels in the third direction and arranged such that long sides of the plurality of lenses have a first angle greater than 0 degrees with respect to the second direction,
wherein each pixel of the plurality of pixels includes a first sub-pixel emitting light of a first color, a second sub-pixel emitting light of a second color, and a third sub-pixel emitting light of a third color,
wherein the plurality of pixels includes a first pixel and a second pixel,
wherein the second sub-pixel of the first pixel is located in the second direction from the first sub-pixel of the first pixel,
wherein the first sub-pixel of the second pixel is located in the second direction from the second sub-pixel of the second pixel,
wherein a length of the third sub-pixel in the second direction is greater than a length of the first sub-pixel in the second direction and a length of the second sub-pixel in the second direction, and
wherein the third sub-pixel is located in the first direction from the first sub-pixel and the second sub-pixel.

13. The stereoscopic image display device of claim 12, wherein an outline shape surrounding the first, second, and third sub-pixels of the first pixel and an outline shape surrounding the first, second, and third sub-pixels of the second pixel are the same.

14. The stereoscopic image display device of claim 12, wherein the second sub-pixel of a pixel located in the second direction from the first pixel is located in the second direction from the first sub-pixel of the pixel located in the second direction from the first pixel.

15. The stereoscopic image display device of claim 14, wherein the first sub-pixel of a pixel located in the second direction from the second pixel is located in the second direction from the second sub-pixel of the pixel located in the second direction from the second pixel.

16. The stereoscopic image display device of claim 12, wherein at least some of the first sub-pixels of the plurality of pixels arranged in the first direction have different coordinates in the second direction,
wherein at least some of the second sub-pixels of the plurality of pixels arranged in the first direction have different coordinates in the second direction, and
wherein the third sub-pixels of the plurality of pixels arranged in the first direction have the same coordinates in the second direction.

17. The stereoscopic image display device of claim 12, wherein the length of the third sub-pixel in the second direction is greater than a sum of the length of the first sub-pixel in the second direction and the length of the second sub-pixel in the second direction.

18. The stereoscopic image display device of claim 12, wherein a distance between the first sub-pixel and the second sub-pixel of the first pixel is equal to a distance between the second sub-pixel and the first sub-pixel of the second pixel.

* * * * *